(12) United States Patent
Gates et al.

(10) Patent No.: US 6,793,109 B2
(45) Date of Patent: *Sep. 21, 2004

(54) OFFSET HOLDING DEVICE

(75) Inventors: George D. Gates, South Jordan, UT (US); Travis D. Gates, Riverton, UT (US)

(73) Assignee: All Rite Products, Inc., West Jordan, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/365,702

(22) Filed: Feb. 12, 2003

(65) Prior Publication Data

US 2003/0168484 A1 Sep. 11, 2003

Related U.S. Application Data

(63) Continuation-in-part of application No. 29/161,098, filed on May 21, 2002, now Pat. No. Des. 476,290, and a continuation-in-part of application No. 09/941,513, filed on Aug. 28, 2001, and a continuation-in-part of application No. 09/941,511, filed on Aug. 28, 2001, now Pat. No. 6,588,637, and a continuation-in-part of application No. 09/459,098, filed on Dec. 13, 1999, now Pat. No. 6,637,707.

(51) Int. Cl.$^7$ ............................................... B60R 7/00
(52) U.S. Cl. ..................... 224/401; 224/420; 224/445; 224/446; 224/448; 224/913; 42/96; 211/64
(58) Field of Search .................................. 224/401, 410, 224/413, 420, 442, 443, 445, 446, 448, 450, 455, 460, 547, 550, 552, 555, 558, 560, 913, 916; 42/94, 96; 211/64, 89.01; 248/205.1, 222.12; D3/262; D12/406; D22/108

(56) References Cited

U.S. PATENT DOCUMENTS

| | | |
|---|---|---|
| 2,708,088 A | 5/1955 | Steinke |
| 3,878,589 A | 4/1975 | Schaefer |
| 3,915,189 A | 10/1975 | Holbrook |
| 3,931,893 A | 1/1976 | Elkins et al. |
| 3,995,742 A | 12/1976 | Austin et al. |
| 4,025,015 A | 5/1977 | Kolic |
| 4,084,735 A | 4/1978 | Kappas |
| 4,108,313 A | 8/1978 | Bogar, Jr. |
| 4,271,997 A | 6/1981 | Michael |
| 4,450,989 A | 5/1984 | Bogar, Jr. |
| 4,461,445 A | 7/1984 | Williamson |
| 4,607,772 A | 8/1986 | Hancock |
| 4,607,773 A | 8/1986 | Mason |
| 4,756,456 A | 7/1988 | Schauer |
| 4,776,471 A | 10/1988 | Elkins |
| 4,858,869 A | 8/1989 | Stang |
| 4,881,386 A | 11/1989 | Glines |
| 4,915,273 A | 4/1990 | Allen |

(List continued on next page.)

OTHER PUBLICATIONS

Visual and textual depiction of ATV Fin Grip Rack product sold by All Rite Products Inc. circa 1997.
Visual and textual depiction of ATV holder product sold by All Rite Products, Inc. circa 1986.

*Primary Examiner*—Stephen K. Cronin
(74) *Attorney, Agent, or Firm*—Thorpe North & Western, LLP

(57) ABSTRACT

An offset holding device configured to be attached to a support structure and to carry elongate objects, including an attachment base configured to be attached to the support structure. A holding member can be attached to the attachment base and can include a generally "U"-shaped member having two upright arms and can be open at the top so as to define a containment area configured to receive the elongate object. A plurality of resilient gripping teeth can extend from at least one of the upright arms into the containment area, the gripping teeth being configured to at least partially deflect upon insertion of the elongate object into the holding member to releasably secure the elongate object within the containment area.

27 Claims, 5 Drawing Sheets

U.S. PATENT DOCUMENTS

| | | |
|---|---|---|
| 4,991,723 A | 2/1991 | Elkins |
| 5,026,016 A | 6/1991 | Lisowski |
| 5,035,389 A | 7/1991 | Wang |
| 5,078,279 A | 1/1992 | Hancock et al. |
| D329,192 S | 9/1992 | Susac |
| 5,344,032 A | 9/1994 | Ramsdell |
| 5,356,038 A | 10/1994 | Banks |
| 5,433,416 A | 7/1995 | Johnson |
| 5,435,511 A | 7/1995 | Hsu |
| 5,452,874 A | 9/1995 | Kozloff et al. |
| 5,524,772 A | 6/1996 | Simmons |
| D386,298 S | 11/1997 | Hancock |
| D386,304 S | 11/1997 | Hancock |
| 5,765,699 A | 6/1998 | Griffin |
| 5,915,572 A | 6/1999 | Hancock |
| 6,142,349 A | 11/2000 | Roberson |
| 6,484,913 B1 | 11/2002 | Hancock |
| 6,695,183 B2 * | 2/2004 | Hancock et al. ............ 224/401 |

* cited by examiner

OFFSET HOLDING DEVICE

PRIORITY DATA

This application is a continuation-in-part of U.S. patent application Ser. No. 09/941,513, filed Aug. 28, 2001, U.S. patent application Ser. No. 09/941,511, filed Aug. 28, 2001, now U.S. Pat. No. 6,588,637, U.S. patent application Ser. No. 09/459,098, filed Dec. 13, 1999, now U.S. Pat. No. 6,637,707, and U.S. patent application Ser. No. 29/161,098, filed May 21, 2002, now U.S. Pat. No. D 476,290, which are each incorporated herein by reference.

BACKGROUND OF THE INVENTION

1. Field of the Invention

The present invention relates generally to a holding device which may be attached to a support structure.

2. Related Art

It is often desired to provide a utility carrying device on an ATV or other vehicle to allow auxiliary items or objects to be stored on the vehicle. Such devices generally must securely hold the object to prevent it from coming loose due to jarring and vibrations which are typical with ATVs and other vehicles, especially off-road vehicles.

Prior art attempts to attach holding devices to a cargo rack of an ATV have generally been designed to extend vertically upward from the cargo rack or other portion of the ATV, thus placing the object contained in the holder directly above the rack. This interferes with full use of the space provided by the rack, and thus reduces the utility of the holding device and of the ATV. In addition, attachment of a general utility carrier is also frequently hampered by the limited frame space available for attachment.

In addition, conventional holding devices have generally been provided with gripping "fins" or "fingers" which engage an object stored within the holding device to secure the object to the underlying structure. While gripping fins and fingers have been used with some success, it is often the case that gripping fins or fingers apply such an aggressive grip to the object being held in the holding device that it is difficult to remove the object from the holding device. This is problematic in that holding devices are often employed in situations where it is particularly desired that the object be removed quickly from the holding device, such as when a hunter encounters game and wishes to quickly retrieve a gun from the holding device.

In addition, holding devices are often employed by hunters or other outdoor enthusiasts who often desire to remove objects from the holding device without causing a great deal of noise. This may be advantageous, for example, if the hunter or outdoor enthusiast does not wish to startle nearby game. However, it is often the case that objects stored in prior art holding devices utilizing fins or fingers cannot be removed without causing a great deal of noise.

SUMMARY OF THE INVENTION

It has been recognized that it would be advantageous to develop an object holding device which does not interfere with the use of the cargo rack and which applies sufficient holding force to an object stored in the device without resulting in undue force being required to remove the object or without creating a great deal of noise when the object is removed. It has also been recognized that it would be advantageous to develop an object holding device which is capable of locking an elongate item into place, so that it does not jar free due to vibrations or bumps encountered by the vehicle.

The invention provides an offset holding device configured to be attached to a support structure and to carry elongate objects, and includes an attachment base configured to be attached to the support structure. A holding member can be attached to the attachment base and can include a generally "U"-shaped member having two upright arms and can be open at the top so as to define a containment area configured to receive the elongate object. A plurality of resilient gripping teeth can extend from at least one of the upright arms into the containment area, the gripping teeth being configured to at least partially deflect upon insertion of the elongate object into the holding member to releasably secure the elongate object within the containment area.

In accordance with another aspect of the invention, the gripping teeth each include a length extending from the upright arm into the containment area, and a base width extending laterally along an attachment location of each of the gripping teeth, the length and the base being substantially equal.

In accordance with another aspect of the invention, the gripping teeth each include a cross-section with a substantially circular shape.

In accordance with another aspect of the invention, the gripping teeth each include a cross-section with a substantially oval shape.

In accordance with another aspect of the invention, the gripping teeth each include a blunt tapering cone, extending from a base attachment location on the upright arm, into the containment area, and tapering to a truncated, rounded tip.

In accordance with another aspect of the invention, each cone includes a length extending from the upright arm into the containment area, and a base width extending laterally along an attachment location of each of the gripping teeth, the length being about 0.2 inches, and the base width being about 0.25 inches.

In accordance with another aspect of the invention, the gripping teeth each include a largest cross section at a base attachment location on the upright arm, a smallest cross section at a tip terminating in the containment area, and a continually tapering cross section therebetween.

In accordance with another aspect of the invention, the attachment base is configured to be attached to an ATV, and the elongate object is selected from the group consisting of: a gun, a bow, a fishing pole, and an elongate tool.

In accordance with another aspect of the invention, an offset mounting stem extends upwardly at an incline from the attachment base, and the holding member is disposed atop the offset mounting stem such that the holding member is disposed away from a space directly above the utility structure, the holding member being configured such that the elongate object does not interfere with said space.

In accordance with another aspect of the invention, a plurality of angled interior wedge members can be disposed end-to-end within the "U"-shaped member in stepped, angled graduations with respect to each other for facilitating the weight of the elongate object placed within the "U"-shaped member to cause the object to be wedged downwardly thereinto to retain the object therein.

In accordance with another aspect of the invention, at least one of the gripping teeth is disposed atop at least one of the angled interior wedge members.

Additional features and advantages of the invention will be apparent from the detailed description which follows, taken in conjunction with the accompanying drawings, which together illustrate, by way of example, features of the invention.

DETAILED DESCRIPTION

Figure 1:
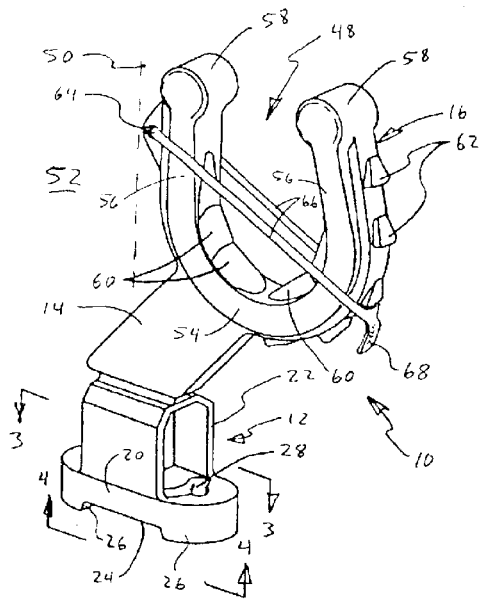
FIG. 1 is a perspective view of one embodiment of an offset holder in accordance with the present invention.

For the purposes of promoting an understanding of the principles of the invention, reference will now be made to the exemplary embodiments illustrated in the drawings, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

An offset utility holding device 10 constructed in accordance with the present invention is shown generally in FIG. 1, and provides a holder which is attachable to a support structure such as a cargo rack of an ATV or other vehicle. The holding device 10 generally comprises an attachment or support base 12, an offset mounting stem 14, and a "U"-shaped holding member 16 atop the offset mounting stem.

The attachment base 12 is configured to be attached to a bar 18 (shown in FIG. 2) of a cargo rack or other utility structure. Such utility structures may include a cargo rack of an ATV or other vehicle, a treestand railing, a treestand footrest, vehicle handlebars, a kickboat frame, etc. The support base 12 generally comprises a base member 20 and an upper portion 22. Viewing FIG. 4, the base member 20 has a bottom surface 24 with two outer flanges 26a, b, and two pivot flanges 27a, b. Disposed between the outer flanges and pivot flanges are opposite arcuate slots 28a and b.

Figure 2:
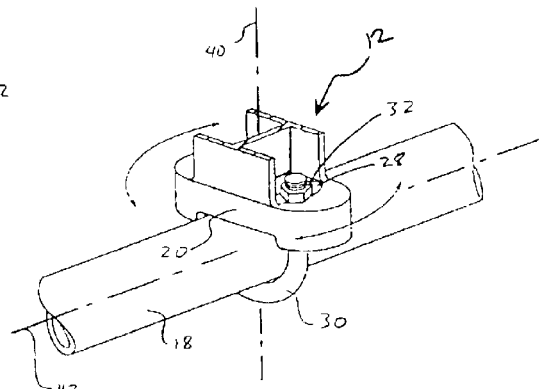
FIG. 2 is a partially sectional, perspective view of a twistable base of the holder of FIG. 1.
Figure 3:
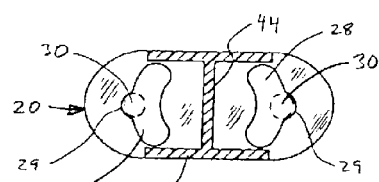
FIG. 3 is a cross-sectional view of the attachment base of the offset holder of FIG. 1, taken along line 3—3.

The base member 20 includes a clamp means adapted for securely attaching the base member to the rack, while the upper portion 22 supports the offset mounting stem 14. The clamp means, as shown in FIG. 2, may comprise a u-bolt 30 disposed around the bar 18 of the support structure, and attached to the base member 20 through the arcuate slots 28a and 28b. As shown in FIG. 1 and FIG. 3, the arcuate slots may include rounded notches 29a, b, to allow the use of a larger (i.e., having a wider outer dimension) u-bolt if desired. Returning to FIG. 2, nuts 32 are disposed on threaded ends of the u-bolt to provide means for tightening or loosening the clamp means. The u-bolt 30 is configured to be tightened to grip the bar of the cargo rack or other utility structure and secure it against the bottom surface 24 of the base member. The support base 12 thus operates as a support for the holder 16, as well as providing a clamp means.

It will be apparent that the clamp means for securely attaching the base member to the rack may be configured in a variety of different ways. For example, viewing FIG. 6, rather than a u-bolt for attaching the base to a round bar or similar support structure, the base 20 may be attached to a flat surface or panel 80 with straight bolts 82. In this embodiment, the straight bolts pass through a mounting plate 84 on one side of the flat panel, through holes 86 in the panel, and into the slots 28, where they are fastened with nuts 32 in the manner described above. In this embodiment, the lower surfaces of the outer flanges 26a and b serve as the bottom surface of the base 20. The invention may thus be adapted to flat cargo racks in addition to railings and other support structures.

Figure 5:
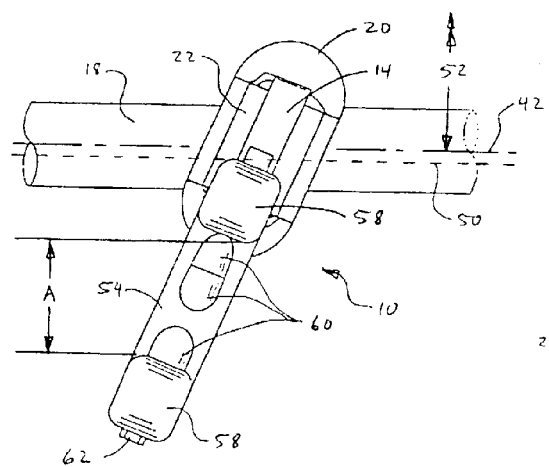
FIG. 5 is a top view of the holder of FIG. 1, showing the holder twisted on its attachment base relative to the support bar.

As illustrated in FIG. 2 and FIG. 5, the support base 12 is pivotable with respect to the bar 18 of the cargo rack or utility structure, such that the holding member 16 may be pivoted to more securely grip elongate objects therein. More specifically, the base member 20 is pivotable about a substantially vertical axis 40, which is perpendicular to a long axis 42 of the bar 18, such that the holder 10 may be pivoted to more securely grip elongate objects disposed in the holding member.

Figure 4:
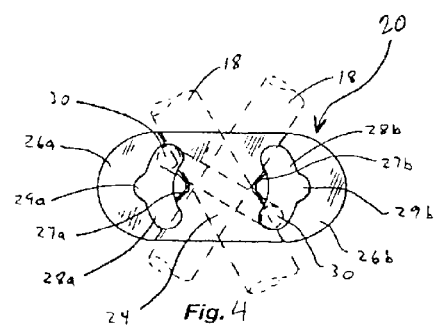
FIG. 4 is a bottom view of the attachment base of the offset holder of FIG. 1, taken along line 4—4.

Because of the configuration of the arcuate slots 28a and b, and the pivot and outer flanges 27 and 26, respectively, of the base member, the orientation of the u-bolt 30 relative to the base member 20 is selectively adjustable, such that the base member may be secured to the bar in any of a plurality of angular orientations relative to the vertical axis 40. This feature is illustrated in FIG. 4, which shows the extreme alternative angular orientations of the bar 18 (shown in hidden lines) relative to the base member 20 and the u-bolt 30 (also in hidden lines). It will be apparent that the base member 20 will also pivot when mounted on a flat panel due to the arcuate shape of the slots 28a, b.

To pivot the base member 20 on the support structure, a user simply loosens the nuts 32, rotates the base member so that the ends of the u-bolt (or straight bolts) slide to a different position in their respective slots 28a and b, and tightens the nuts again. Alternatively, a user may tighten the nuts just enough to secure the orientation of the holder so that it does not move with vibration, etc., yet allows the holder to be rotated with sufficient manual effort by the user.

Viewing FIG. 5, the pivotable configuration advantageously enables the holder 10 to be rotated to effectively close or reduce the aspect A of the containment area relative to the long dimension of the elongate object, which is presumably parallel to the long axis 42 of the support bar 18. This allows for twist adjustment and locking, and allows the holder to fit objects of various sizes, while still providing a firm grip. The extreme alternative angular orientations of the bar 18 (shown in hidden lines) relative to the base member 20 are also shown in FIG. 4 to illustrate the pivotability or angular adjustment feature of the invention.

In addition to the pivotable configuration discussed above, other pivotable mounting configurations can also be utilized. For instance, the offset holding device can be fixedly mounted on a threaded mounting stem that includes a locking nut (not shown). In this aspect, the mounting stem can be threaded onto a lower section of a mounting structure mounted to a support structure (not shown). The offset holder can then be adjusted vertically and rotationally with the threaded mounting stem, and then locked into place with the locking nut (not shown).

Returning to FIG. 1, the offset mounting stem 14 extends upwardly at an incline from the upper portion 22 of the support base 12. The upper portion 22 of the support base is configured with an I-beam structure 44 for strength (shown more clearly in the cross-sectional view of FIG. 3). The offset mounting stem 14 is fixedly attached at its bottom end to the upper portion of support base, and fixedly attached at its top end to a lower part of the holding member 16 at a point approximately below a center of the holding member. This point of attachment to the holding member provides solid support for the holding member, yet places a containment area 48 of the holder horizontally offset from a line 50 representing the perimeter of the cargo rack or other support structure, as shown.

The offset design orients an object in the holder 10 away from the ATV rack or support, and thus provides more space on the ATV. It does this by placing the holding member 16 away from a space directly above the utility structure, such that the elongate object does not interfere with the space directly above the utility structure. Viewing FIG. 1 and FIG. 5, the holding device may be attached to a cargo rack disposed on a vehicle, the cargo rack having a cargo space 52 vertically thereabove. The offset mounting stem 14 extends upwardly at an incline from the support base 12 to the holding member 16, and thus places the holding member substantially outside the cargo space 52.

Stated differently, the cargo rack has an edge which may be defined as a vertical plane coincident with the centerline 42 of the cargo rack bar 18. This edge represents the limits of the cargo space 52. The offset mounting stem 14 extends upwardly at an incline from the support base and away from the edge, such that the holding member is substantially outside the cargo space, beyond a vertical perimeter 50. The exact location of the vertical perimeter 50 will vary when the holder is pivoted, and may be directly above the edge of the cargo rack (i.e. above the centerline 42), or offset from the centerline in a direction away from the cargo space, as shown in FIG. 5.

The holding member 16 is designed to receive and carry a variety of elongated objects, such as a rifle, tools, sports equipment, etc. The holding member comprises a generally "U"-shaped member 54 having two upright arms 56 which are open at the top so as to define a containment area 48 configured to receive an elongate object. The holding member may include flexible rubber balls 58 atop the upright arms to help hold objects in the rack. It will be apparent that various shapes and methods of attachment of such rubber balls can be employed.

Figure 11:
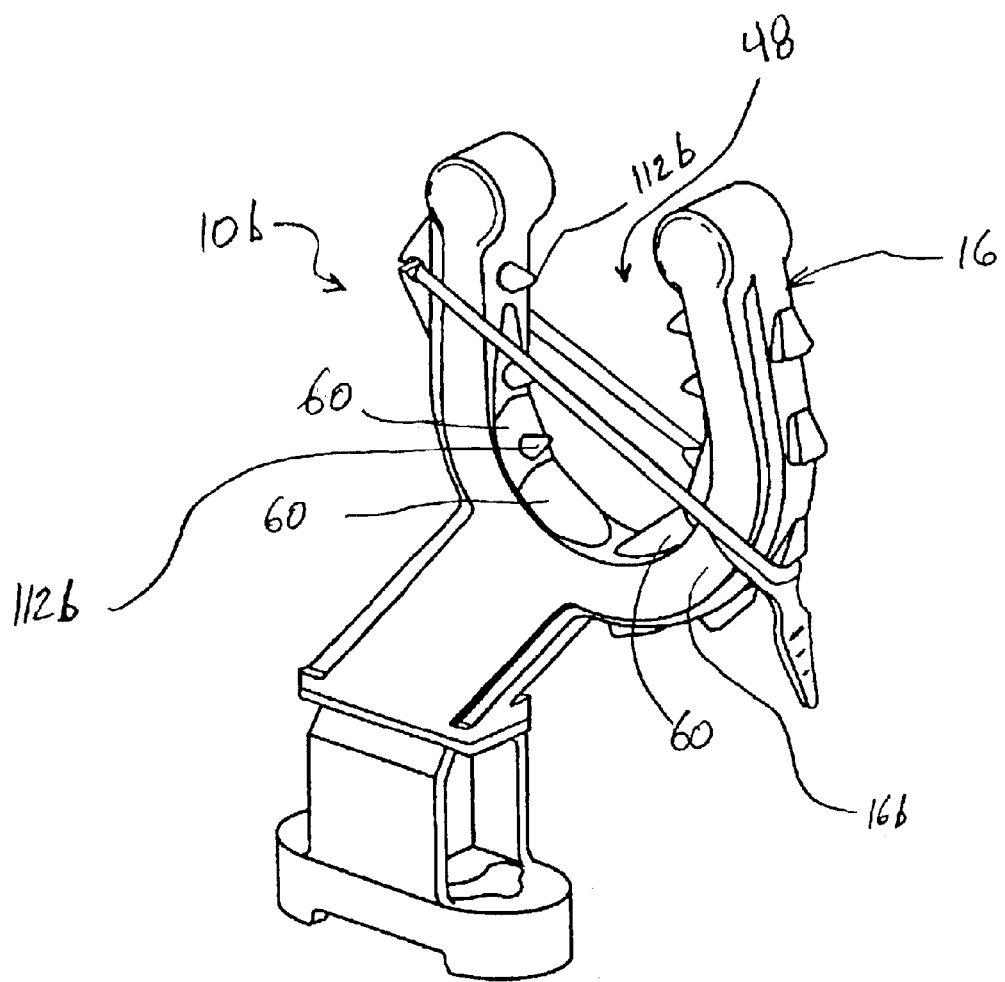
FIG. 11 is a perspective view of a holding device including angled interior wedge members and gripping teeth in accordance with another aspect of the present invention.

As shown in FIGS. 1 and 11, in one embodiment, the holding member 16 further comprises opposingly inclined resilient surfaces 60 disposed in the containment area 48 of the "U"-shaped member 54, for gripping objects placed therein. This design provides a tapering structure with internal angles to form fit and hold items of different diameters or sizes, and causes a contained object to nest in a secure position toward the base of the "U". The opposingly inclined resilient surfaces 60 can be formed of rubber material to securely grip the object. These surfaces also facilitate locking the object in place when the holder is rotated.

The holding member 16 may also include wedge-shaped hold-down attachments 62 disposed on an outside surface of the "U"-shaped member 54 for accommodating a hold-down member 66 for securing an object in the containment area 48. A hold-down loop 64 is disposed on an opposing side of the "U"-shaped member, allowing one end of the hold-down member 66 to be inserted therein. With an object in the containment area of the holding member, the opposing end of the hold-down member may be stretched over the object, and hooked or tied about one of the hold-down attachments 62 on the opposite outer side of the holding member. In this way, a secure grip may be provided for varied sizes of objects.

Figure 6:
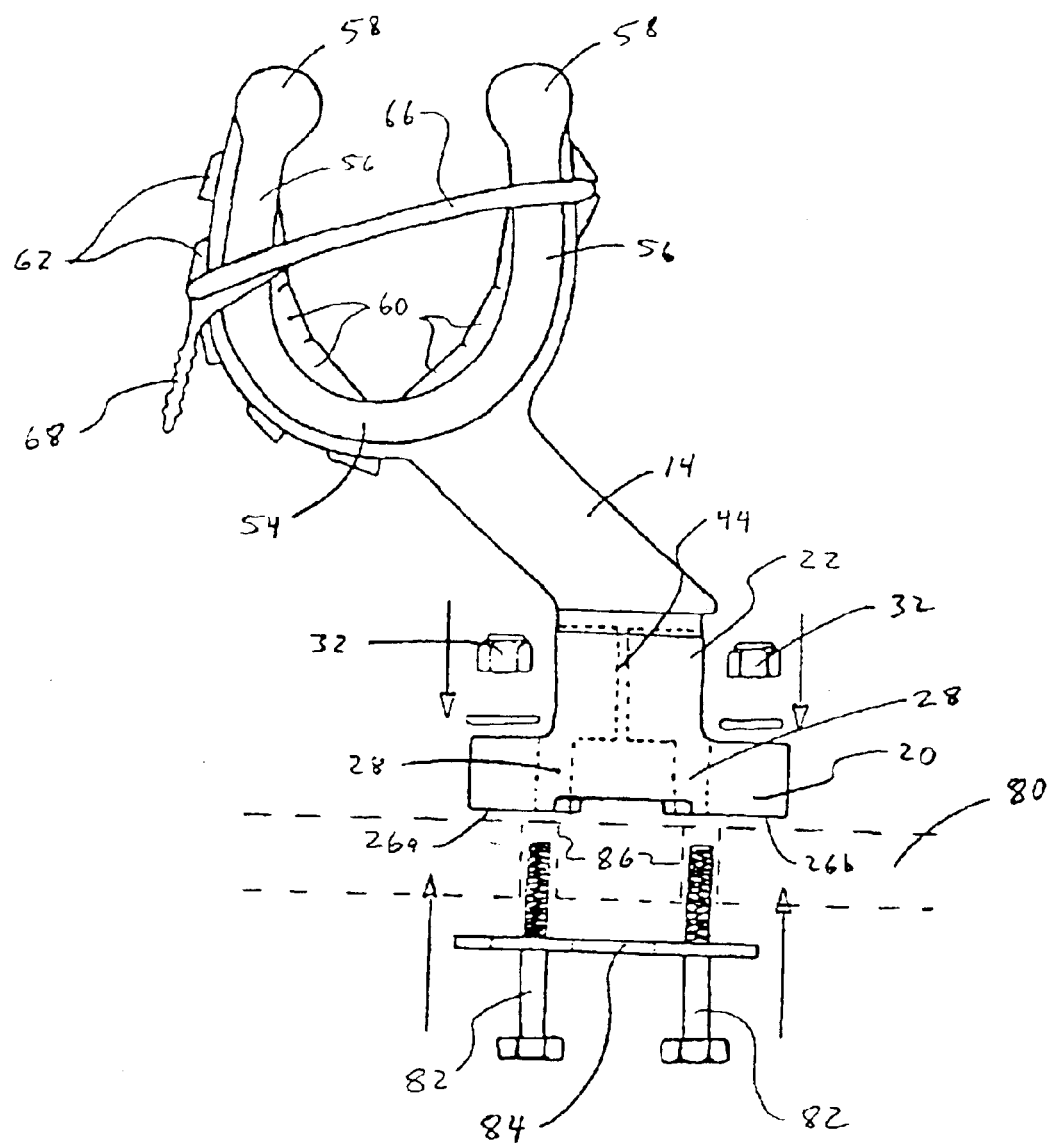
FIG. 6 is a side elevational view of an alternative embodiment of an offset holder having an attachment base configured for attachment to a flat panel support structure.

Suitable hold-down members may include rope, string, elastic cord, or other such devices adaptable for securing or tying an object within the holding member. As depicted in FIG. 1 and FIG. 6, one type of elastic cord specifically suited as a hold-down member 66 is a snubber, which is a loop of elastic material with a tab 68 on one end. The tab is configured for grasping by a user, and allows the hold-down member to be quickly and easily attached or removed from the holder.

While a single holding device 10 as depicted in FIG. 1 may be used for some types of objects, or may be used in combination with some other support device for holding an elongate object, it will be apparent that a utility holding system comprising a plurality of holding devices 10 can also be utilized. The two or more holding devices are typically attached to a cargo rack or other support structure, and are disposed with their holding members in alignment such that an elongate object may be supported by the two or more holders. To help secure the elongate object in the holders, each holder may be rotated to effectively close or reduce the aspect of the containment area relative to the long dimension of the elongate object.

The holding device in its entirety, or any of its constituent parts, may be constructed of numerous materials including metals, plastics, and rubber materials. In one embodiment, the entire holder 10 is injection molded of durable nylon material, and the mounting stem 14 and holder 16 are then provided with a thick coating of resilient Sanoprene rubber material. This rubber material provides excellent gripping and wear characteristics. Specific selection of materials will depend on the characteristics of weight, strength and function desired.

In addition to the opposingly inclined resilient surfaces 60 shown in FIGS. 1 and 6, the present invention can also advantageously include a variety of gripping surfaces or teeth to aid in securing the object within the holding device. Depending upon particular applications, the inclined resilient surfaces 60 may not be desired in particular circumstances. As illustrated at 10a in FIG. 7, in the case where a more aggressive grip upon the object being held is desired, the present invention can also include a plurality of resilient gripping teeth 112. The gripping teeth 112 can extend from at least one of the upright arms 56a of the U-shaped holding member 16a into the containment area 48a. The gripping teeth can be configured to at least partially deflect upon insertion of the elongate object into the holding member 16a to releasably secure the elongate object within the containment area 48a.

The gripping teeth can be included as an alternative to the inclined resilient surfaces 60, or can be included with the inclined surfaces. As shown generally at 10b in FIG. 11, a plurality of angled interior wedge members 60 can be disposed end-to-end within the "U"-shaped member 16b in stepped, angled graduations with respect to each other. The angled interior wedge members can facilitate the weight of the elongate object (not shown) placed within the "U"-shaped member to cause the object to be wedged downwardly thereinto to retain the object therein. As shown in FIG. 11, at least one of the gripping teeth 112b can be disposed atop at least one of the angled interior wedge members 60 to provide a combination gripping tooth and inclined surface gripping interface. As shown in FIG. 11, the teeth and wedge members can also be disposed in a side-by-side configuration.

While the gripping teeth 112 can provide a more aggressive gripping force than may be obtained with the inclined resilient surfaces shown in FIGS. 1 and 6, the gripping teeth are not so aggressive as prior art methods which utilize gripping fins or fingers. Because the gripping teeth are more bulky and rigid than prior art fins or fingers, the gripping teeth have been found to provide a superior gripping interface between the elongate object and the holding device 16a. The gripping teeth can generally be made shorter and stouter than gripping fins or fingers and are thus less susceptible to damage from tearing due to contact with the elongate object or other objects. The shorter and stouter gripping teeth also reduce the amount of material required to provide a gripping interface, thereby reducing material and manufacturing costs.

In addition, the gripping teeth do not consume as much space inside the containment area 48a of holding member 16a as do conventional gripping fingers or fins. The resulting holding device can thus include a larger containment area within similarly spaced upright arms 56a. In this manner, the upright arms 56a can be spaced closer together and yet still provide a sufficiently large containment area 48a for holding a variety of elongate objects.

Figure 7:
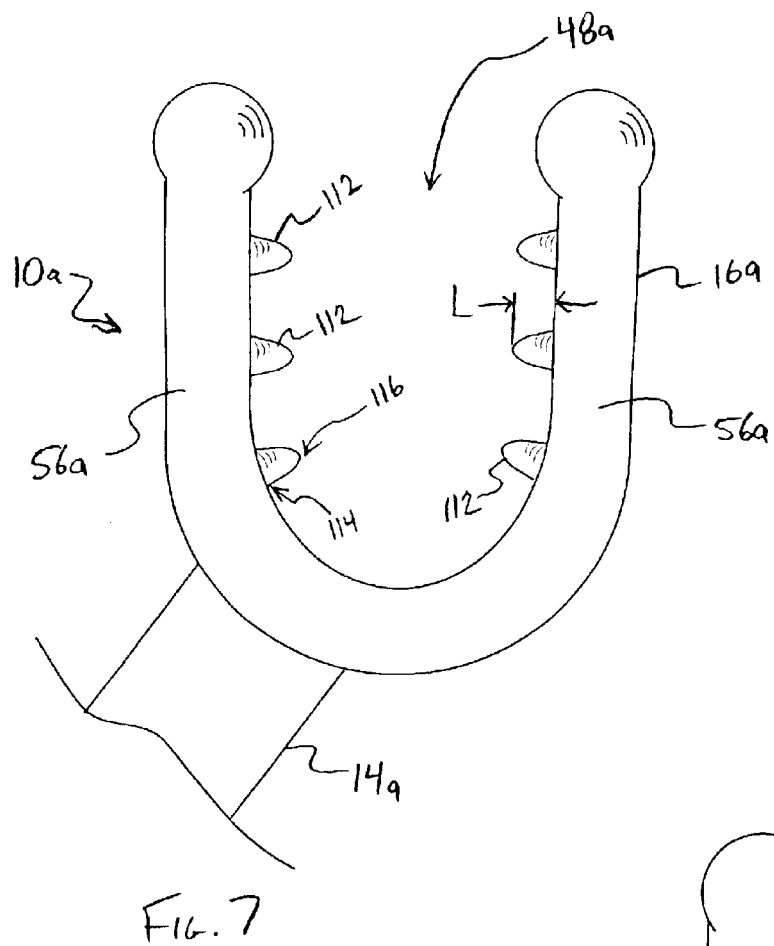
FIG. 7 is a partial side view of a holding device in accordance with the present invention including gripping teeth extending into the containment area in accordance with one embodiment of the present invention.
Figure 8:
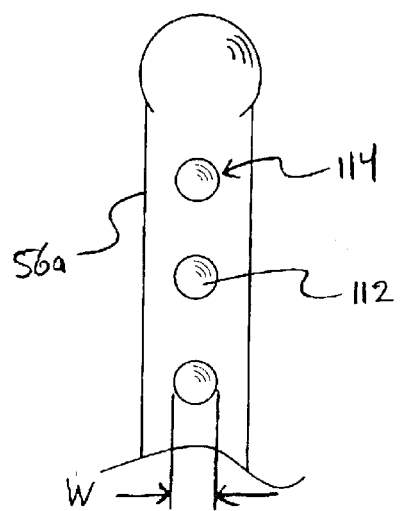
FIG. 8 is an inside, partial side view of an upright arm including gripping teeth in accordance with one embodiment of the present invention.

In one embodiment of the invention, as shown in FIGS. 7 and 8, the gripping teeth 112 can each include a blunt tapering cone that extends from a base attachment location 114 on the upright arm 56a, into the containment area 48a and tapers to a truncated, rounded tip 116. The blunt tapering cone thus provides a non-planar contact surface to the elongate object to secure the elongate object within the holding device without requiring that undue force be applied to the object to remove the object. Prior art gripping fingers or fins generally either provided an elongate or planar gripping surface to the elongate object stored within the prior art holders. This elongate or planar gripping surface contacted the object with a large mating surface area. Often, gripping fins or fingers bend considerably downward into the containment area upon insertion of the object into the containment area, resulting in a large portion of the gripping finger or fin contacting and gripping the object. The resultant grip on the object is often of such magnitude that removing the object required a great deal of force, and often created a great deal of noise.

In contrast, the conical gripping teeth of the present invention provide a relatively short, non-planar contact surface to the object such that the object is held securely in the holding member 16a while minimizing the force required to remove the object and the noise created upon removal of the object. In addition, the gripping teeth are formed in a shape that results in the teeth being resilient but not overly flexible. The relatively blunt gripping teeth thus bend upon insertion of an object into the containment area, but resist large-scale flexing to reduce the surface area contacting the elongate object.

As shown in FIGS. 7 and 8, the gripping teeth can each include a length L extending from the upright arm 56a into the containment area 48a, and a base width W extending laterally along an attachment location 114 of each of the gripping teeth. The length L and the base width W can be substantially equal. As used herein, the term "substantially equal" is meant to indicate a state in which the dimensions being compared are within about 30% of each other. Thus, in one embodiment, the length L of the teeth is about 0.2 inches, and the base width W is about 0.25 inches.

As shown in side view in FIG. 7, each of the gripping teeth can include a largest cross section at a base attachment location 114 on the upright arm 48a and a smallest cross section at a tip 116 terminating in the containment area. The cross-section of each teeth can also include a continually tapering cross section therebetween. In this manner, the widest, or thickest, portion of the teeth, i.e., the portion of the teeth that is least likely to bend upon insertion of an object into the holder, resides at the contact location on the upright arm. The thinnest portion of the teeth, or the portion most likely to bend upon insertion of an object into the holder, resides at the innermost point 116 of each tooth. As an object is inserted into the holder, the teeth bend mostly at the tip portion to provide a retaining force to the elongate object. Thus, the object is contacted by only a relatively small area of the gripping teeth, resulting in sufficient grip to hold the object while allowing the object to be relatively easily and quietly removed from the holding device.

Figure 9:
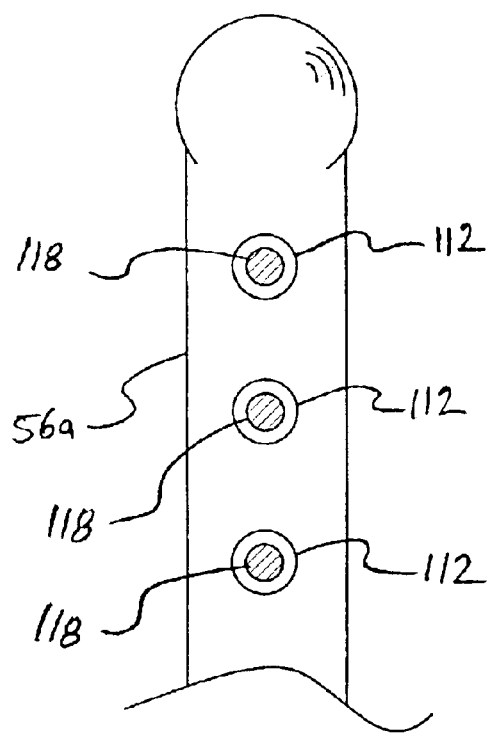
FIG. 9 is an inside, partial side view of an upright arm including gripping teeth in accordance with another embodiment of the present invention.

As shown in cut-away view in FIG. 9, the gripping teeth 112 can include a cross-section 118 with a substantially circular shape. In one embodiment, the cross section of the tooth, taken at any location along the length L (shown in FIG. 7), is substantially circular and reduces in diameter from the base attachment location 114 to the tip section 116. In this manner, a non-planar contact interface is provided between the gripping teeth and the elongate object to provide a secure grip on the elongate object while minimize the magnitude of the gripping force provided by the teeth to allow the elongate object to be easily and quietly removed from the holding device.

Figure 10:
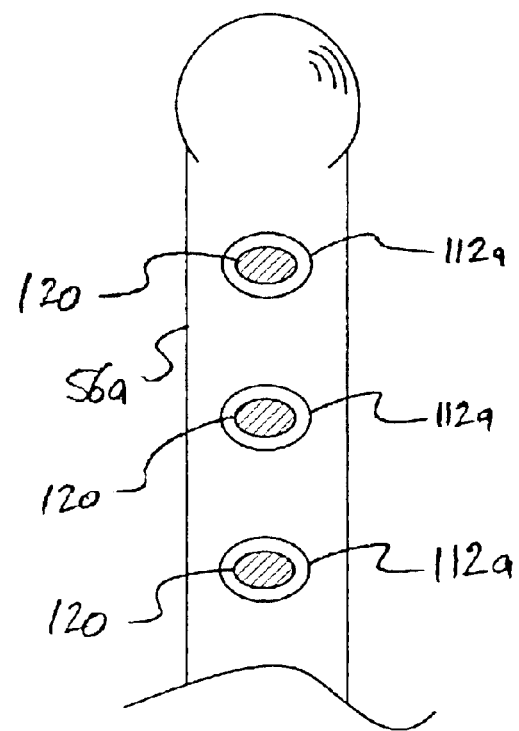
FIG. 10 is an inside, partial side view of an upright arm including gripping teeth in accordance with another embodiment of the present invention.

In another embodiment, as shown in FIG. 10, the gripping teeth 112a can each include a cross-section 120 with a substantially oval shape. The cross section of the oval-shaped gripping teeth can be substantially oval taken at any location along the length L (shown in FIG. 7) and can reduce in major or minor diameter from the base attachment location 114 to the tip section 116. Thus, a non-planar contact interface is provided between the gripping teeth and the elongate object to provide a secure grip on the elongate object while minimize the magnitude of the gripping force provided by the teeth to allow the elongate object to be easily and quietly removed from the holding device.

In addition to the offset holding devices discussed above, the gripping teeth can be used in any suitable generally U-shaped holding device. Such devices can include non-offset holding devices, permanently mounted holding devices, adjustable holding devices, etc. In addition, the U-shaped holding device can be vertically or horizontally disposed above the support structure, or in any combination therebetween.

As discussed in previous embodiments, the attachment base can be configured to be attached to a variety of support structures (not shown) to hold a variety of elongate objects (not shown). In one embodiment, the support structure is an ATV. As used herein, the term "ATV" is meant to include an All Terrain Vehicle, a motor vehicle, a boat, a snowmobile, motorcycle, etc. Similarly, while the elongate can be any suitable object, in one embodiment the elongate object is selected from the group consisting of: a gun, a bow, a fishing pole, and an elongate tool. Examples of elongate tools include, but are not limited to, shovels, rakes, picks, etc.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been shown in the drawings and fully described above with particularity and detail in connection with what is presently deemed to be the most practical and preferred embodiment(s) of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims.

What is claimed is:

1. An offset holding device configured to be attached to a support structure and to carry an elongate object, comprising:
   an attachment base configured to be attached to the support structure;
   an offset mounting stem extending upwardly at an incline from the attachment base; and
   a holding member, disposed atop the offset mounting stem, the holding member including a generally "U"-shaped member having two upright arms and being open at the top so as to define a containment area configured to receive the elongate object; and
   a plurality of resilient gripping teeth extending from at least one of the upright arms into the containment area, the gripping teeth being configured to at least partially deflect upon insertion of the elongate object into the holding member to releasably secure the elongate object within the containment area;
   the gripping teeth each including a length extending from the upright arm into the containment area, and a base width extending laterally along an attachment location of each of the gripping teeth, the length and the base width being substantially equal.

2. The holding device of claim 1, wherein the gripping teeth each include a largest cross section at a base attachment location on the upright arm, a smallest cross section at a tip terminating in the containment area, and a continually tapering cross section therebetween.

3. The holding device of claim 1, wherein the attachment base is configured to be attached to an ATV, and wherein the elongate object is selected from the group consisting of: a gun, a bow, a fishing pole, and an elongate tool.

4. An offset holding device configured to be attached to a support structure and to carry an elongate object, comprising:
   an attachment base configured to be attached to the support structure;
   an offset mounting stem extending upwardly at an incline from the attachment base; and
   a holding member, disposed atop the offset mounting stem, the holding member including a generally "U"-shaped member having two upright arms and being open at the top so as to define a containment area configured to receive the elongate object; and
   a plurality of resilient grinning teeth extending from at least one of the upright arms into the containment area, the gripping teeth being configured to at least partially deflect upon insertion of the elongate object into the holding member to releasably secure the elongate object within the containment area;
   the gripping teeth each including a cross-section with a substantially circular shape.

5. An offset holding device configured to be attached to a support structure and to carry an elongate object, comprising:
   an attachment base configured to be attached to the support structure;
   an offset mounting stem extending upwardly at an incline from the attachment base; and
   a holding member, disposed atop the offset mounting stem, the holding member including a generally "U"-shaped member having two upright arms and being open at the top so as to define a containment area configured to receive the elongate object; and
   a plurality of resilient gripping teeth extending from at least one of the upright arms into the containment area, the gripping teeth being configured to at least partially deflect upon insertion of the elongate object into the holding member to releasably secure the elongate object within the containment area;
   the gripping teeth each including a cross-section with a substantially oval shape.

6. An offset holding device configured to be attached to a support structure and to carry an elongate object, comprising:
   an attachment base configured to be attached to the support structure;
   an offset mounting stem extending upwardly at an incline from the attachment base; and
   a holding member, disposed atop the offset mounting stem, the holding member including a generally "U"-shaped member having two upright arms and being open at the top so as to define a containment area configured to receive the elongate object; and
   a plurality of resilient gripping teeth extending from at least one of the upright arms into the containment area, the gripping teeth being configured to at least partially deflect upon insertion of the elongate object into the holding member to releasably secure the elongate object within the containment area;
   the gripping teeth each including a blunt tapering cone, extending from a base attachment location on the upright arm, into the containment area, and tapering to a truncated, rounded tip.

7. The holding device of claim 6, wherein each cone includes a length extending from the upright arm into the containment area, and a base width extending laterally along an attachment location of each of the gripping teeth, the length being about 0.2 inches, and the base width being about 0.25 inches.

8. A holding device configured to be attached to a support structure and to carry an elongate object, comprising:
   an attachment base configured to be attached to the support structure;
   a holding member, disposed atop the attachment base, the holding member including a generally "U"-shaped member having two upright arms and being open at the top so as to define a containment area configured to receive the elongate object; and a plurality of resilient gripping teeth extending from at least one of the upright arms into the containment area, each of the gripping teeth including a largest cross-section at a base attachment location on the upright arm, a smallest cross-section at a tip terminating in the containment area, and a continually tapering cross-section therebetween;

the gripping teeth being configured to at least partially deflect upon insertion of the elongate object into the holding member to releasably secure the elongate object within the containment area:

wherein the gripping teeth each include a length extending from the upright arm into the containment area, and a base width extending laterally along an attachment location of each of the gripping teeth, the length and the base width being substantially equal.

9. The holding device of claim 8, wherein the attachment base is configured to be attached to an ATV, and wherein the elongate object is selected from the group consisting of: a gun, a bow, a fishing pole, and an elongate tool.

10. A holding device configured to be attached to a support structure and to carry an elongate object, comprising:

an attachment base configured to be attached to the support structure;

a holding member, disposed atop the attachment base, the holding member including a generally "U"-shaped member having two upright arms and being open at the top so as to define a containment area configured to receive the elongate object; and a plurality of resilient gripping teeth extending from at least one of the upright arms into the containment area, each of the gripping teeth including a largest cross-section at a base attachment location on the upright arm, a smallest cross-section at a tip terminating in the containment area, and a continually tapering cross-section therebetween;

the gripping teeth being configured to at least partially deflect upon insertion of the elongate object into the holding member to releasably secure the elongate object within the containment area;

the gripping teeth each including a cross-section with a substantially circular shape.

11. A holding device configured to be attached to a support structure and to carry an elongate object, comprising:

an attachment base configured to be attached to the support structure;

a holding member, disposed atop the attachment base, the holding member including a generally "U"-shaped member having two upright arms and being open at the top so as to define a containment area configured to receive the elongate object; and a plurality of resilient gripping teeth extending from at least one of the upright arms into the containment area, each of the gripping teeth including a largest cross-section at a base attachment location on the upright arm, a smallest cross-section at a tip terminating in the containment area, and a continually tapering cross-section therebetween;

the gripping teeth being configured to at least partially deflect upon insertion of the elongate object into the holding member to releasably secure the elongate object within the containment area;

the gripping teeth each including a cross-section with a substantially oval shape.

12. A holding device configured to be attached to a support structure and to carry an elongate object, comprising:

an attachment base configured to be attached to the support structure;

a holding member, disposed atop the attachment base, the holding member including a generally "U"-shaped member having two upright arms and being open at the top so as to define a containment area configured to receive the elongate object; and a plurality of resilient tripping teeth extending from at least one of the upright arms into the containment area, each of the gripping teeth including a largest cross-section at a base attachment location on the upright arm, a smallest cross-section at a tip terminating in the containment area, and a continually tapering cross-section therebetween;

the gripping teeth being configured to at least partially deflect upon insertion of the elongate object into the holding member to releasably secure the elongate object within the containment area;

the gripping teeth each including a blunt tapering cone, extending from a base attachment location on the upright arm, into the containment area, and tapering to a truncated, rounded tip.

13. The holding device of claim 12, wherein each cone includes a length extending from the upright arm into the containment area, and a base width extending laterally along an attachment location of each of the cone, the base width being about 0.25 inches and the length being about 0.2 inches.

14. The holding device of claim 12, wherein each cone includes a length extending from the upright arm into the containment area, and a base width extending laterally along an attachment location of each of the cone, the base width being about 0.25 inches and the length being about 0.2 inches.

15. A holding device configured to be attached to a support structure and to carry an elongate object, comprising:

an attachment base configured to be attached to the support structure;

a holding member, disposed atop the attachment base, the holding member including a generally "U"-shaped member having two upright arms and being open at the top so as to define a containment area configured to receive the elongate object; and a plurality of resilient gripping teeth extending from at least one of the upright arms into the containment area, each of the gripping teeth including a blunt tapering cone, extending from a base attachment location on the upright arm, into the containment area, and tapering to a truncated, rounded tip;

the gripping teeth being configured to at least partially deflect upon insertion of the elongate object into the holding member to releasably secure the elongate object within the containment area.

16. The holding device of claim 15, wherein the gripping teeth each include a length extending from the upright arm into the containment area, and a base width extending laterally along an attachment location of each of the gripping teeth, the length and the base width being substantially equal.

17. The holding device of claim 15, wherein the gripping teeth each include a cross-section with a substantially circular shape.

18. The holding device of claim 15, wherein the gripping teeth each include a cross-section with a substantially oval shape.

19. The holding device of claim 15, wherein the gripping teeth each include a largest cross section at a base attachment location on the upright arm, a smallest cross section at a tip terminating in the containment area, and a continually tapering cross section therebetween.

20. The holding device of claim 15, wherein the attachment base is configured to be attached to an ATV, and wherein the elongate object is selected from the group consisting of: a gun, a bow, a fishing pole, and an elongate tool.

21. A holding device configured to be attached to a support structure and to carry an elongate object, comprising:

a holding member including a generally "U"-shaped member having two upright arms and being open at the top so as to define a containment area configured to receive the elongate object;

a plurality of angled interior wedge members disposed end-to-end within the "U"-shaped member in stepped, angled graduations with respect to each other for facilitating the weight of the elongate object placed within the "U"-shaped member to cause the object to be wedged downwardly thereinto to retain the object therein; and a plurality of resilient gripping teeth extending from at least one of the upright arms into the containment area, the gripping teeth being configured to at least partially deflect upon insertion of the elongate object into the holding member to releasably secure the elongate object within the containment area.

22. The holding device of claim 21, wherein the gripping teeth each include a length extending from the upright arm into the containment area, and a base width extending laterally along an attachment location of each of the gripping teeth, the length and the base width being substantially equal.

23. The holding device of claim 21, wherein the gripping teeth each include a cross-section with a substantially circular shape.

24. The holding device of claim 21, wherein the gripping teeth each include a cross-section with a substantially oval shape.

25. The holding device of claim 21, wherein the gripping teeth each include a blunt tapering cone, extending from a base attachment location on the upright arm, into the containment area, and tapering to a truncated, rounded tip.

26. The holding device of claim 21, wherein the gripping teeth each include a largest cross section at a base attachment location on the upright arm, a smallest cross section at a tip terminating in the containment area, and a continually tapering cross section therebetween.

27. The holding device of claim 21, wherein at least one of the gripping teeth is disposed atop at least one of the angled interior wedge members.

* * * * *